Nov. 4, 1952 J. ERWOOD ET AL 2,616,702
RECORD CHANGING MECHANISM
Filed April 6, 1945 6 Sheets-Sheet 1
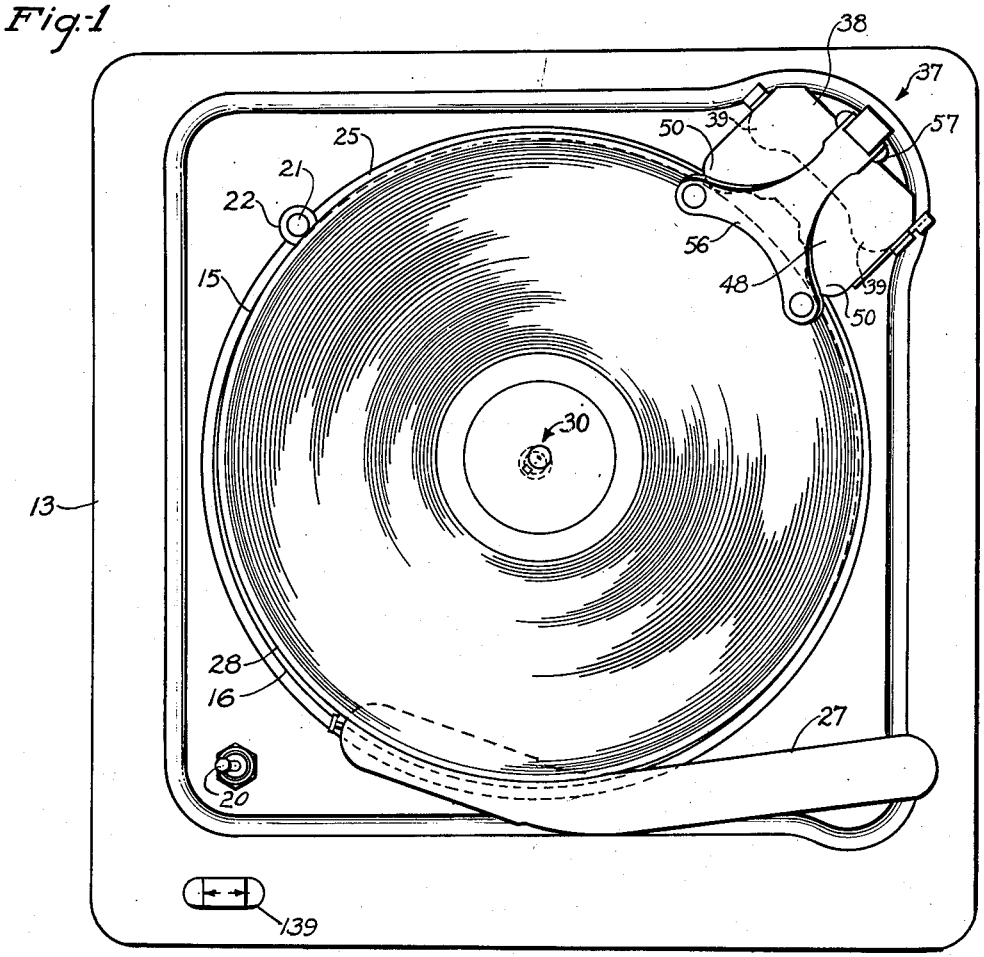
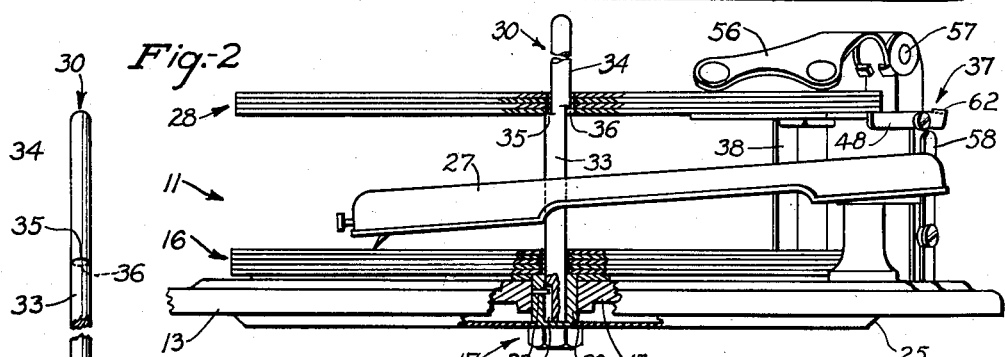
Inventors
Joseph Erwood &
John Erwood
By: Spencer, Margall, Johnston & Cook
Attorneys Nov. 4, 1952 J. ERWOOD ET AL 2,616,702
RECORD CHANGING MECHANISM
Filed April 6, 1945 6 Sheets-Sheet 2
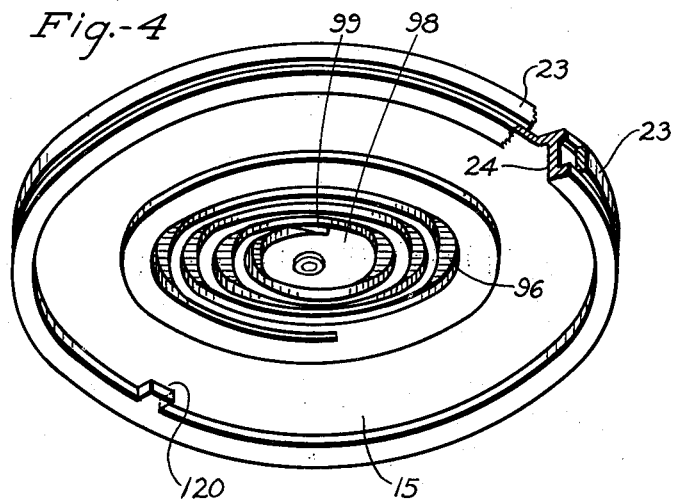
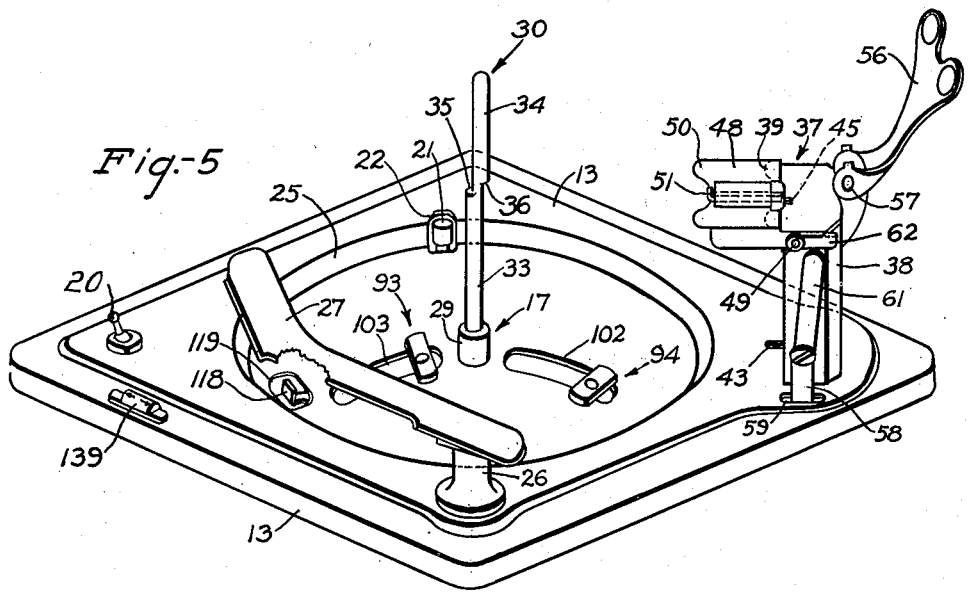
Inventors
Joseph Erwood &
John Erwood
By: Spencer, Marzell, Johnston & Cook
Attorneys Nov. 4, 1952     J. ERWOOD ET AL     2,616,702
RECORD CHANGING MECHANISM Filed April 6, 1945     6 Sheets-Sheet 3

Inventors
Joseph Erwood &
John Erwood
By: Spencer, Marzall, Johnston & Cook
Attorneys

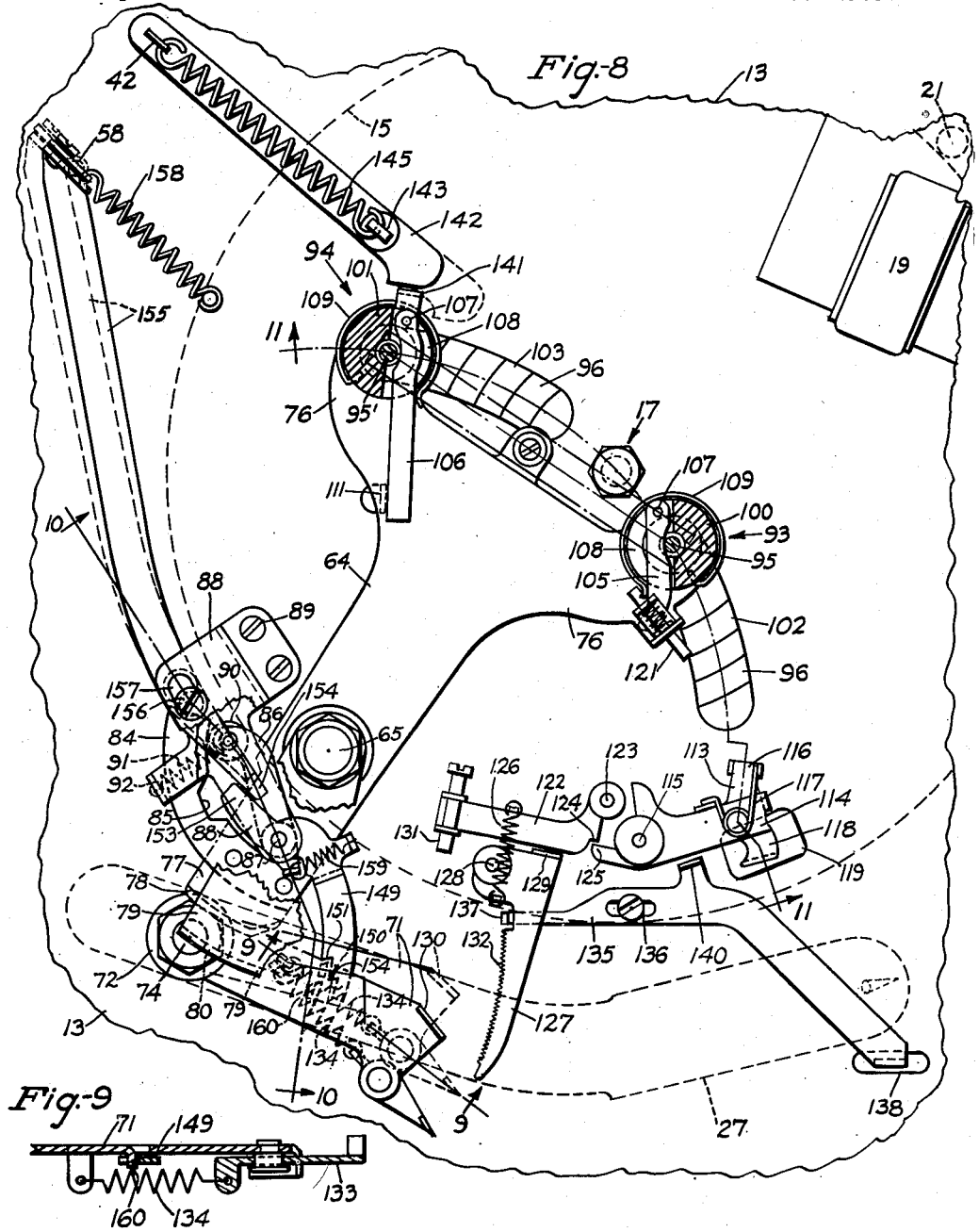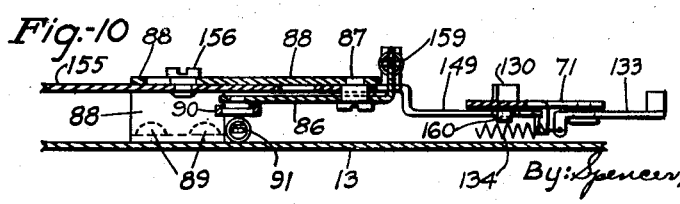

Nov. 4, 1952     J. ERWOOD ET AL     2,616,702
RECORD CHANGING MECHANISM

Filed April 6, 1945     6 Sheets-Sheet 5

Inventors
Joseph Erwood &
John Erwood
By: Spencer, Marzall, Johnston & Cook
Attorneys Nov. 4, 1952 — J. ERWOOD ET AL — 2,616,702
RECORD CHANGING MECHANISM
Filed April 6, 1945 — 6 Sheets-Sheet 6
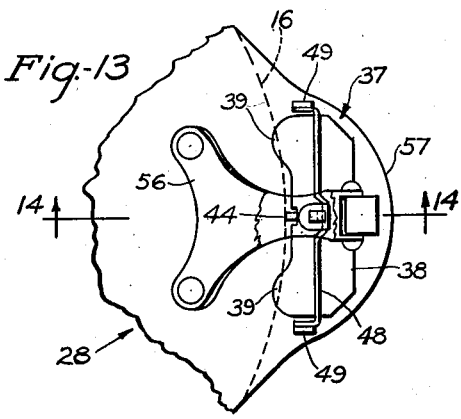
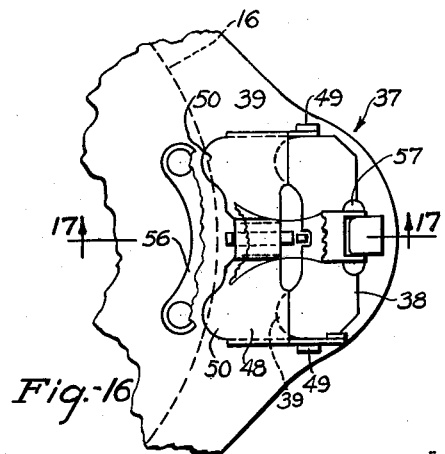
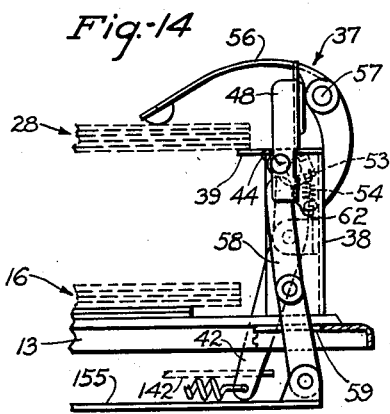
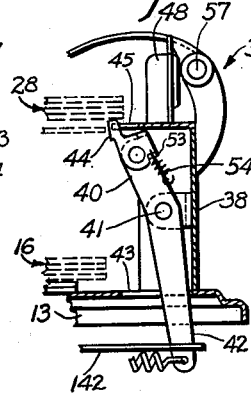
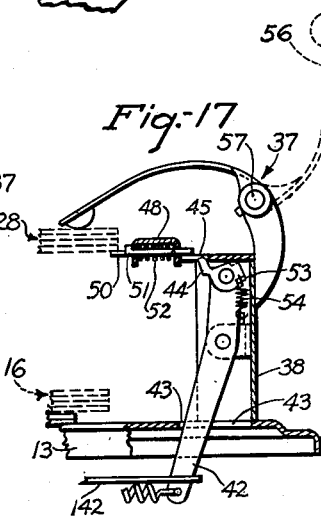
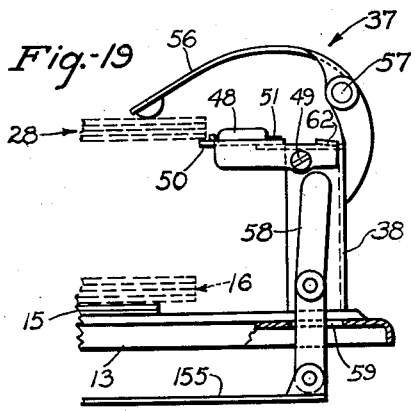
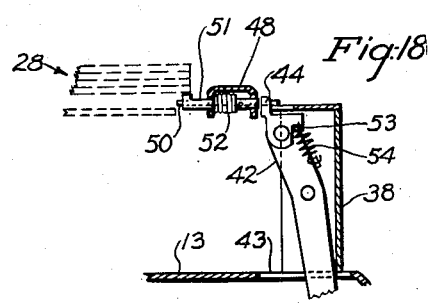
Inventors
Joseph Erwood &
John Erwood
By: Spencer, Marzall, Johnston & Cook
Attorneys Patented Nov. 4, 1952

2,616,702

UNITED STATES PATENT OFFICE 2,616,702

RECORD CHANGING MECHANISM

Joseph Erwood and John Erwood, Chicago, Ill., assignors, by mesne assignments, to William J. McGah, as trustee Application April 6, 1945, Serial No. 586,860

3 Claims. (Cl. 274—1)

The present invention relates generally to intermittent feed apparatus and refers more particularly to phonographic record changing mechanism for delivering phonograph records successively into operating position in record playing apparatus.

Automatic record playing and changing apparatus may comprise means for delivering record discs successively from a stack or magazine to a motor driven record playing turntable, in combination with means for applying and withdrawing a sound pickup device to and from the record disc, at properly timed intervals whereby to play the record and to retract the pickup device from the record and move it to a stand-by position at the end of the playing operation, in order to allow a succeeding record to be delivered on the turntable in position to be played.

An important object of the present invention is to provide improved and simplified record playing and changing apparatus having a minimum number of operating parts facilitating assembly thereof in the provision of low-cost record changing apparatus requiring minimum care and adjustment, and affording improved performance.

Another important object is to provide record changing apparatus adapted normally to be retained in cocked, yet inactive condition, while a record is being played, the mechanism being rendered active, at the conclusion of the playing of a record, to deliver a successive record to be played upon the turntable and to return to inactive cocked position; a further object being to provide manually operable means for releasing the change mechanism for operation at any time during the playing of a record, in order to reject the same and deliver another record in playing position.

Another important object is to provide simplified mechanism for raising, lowering and swinging the tone arm pickup of record playing mechanism as a part of a record changing cycle; a further object being to raise and lower the tone arm by means of a cam actuated by the change mechanism at predetermined intervals during its operating cycle; a further object being to swingingly move the arm at predetermined intervals in the operating cycle of the change mechanism by means of a friction wheel and driving segment connected with the change mechanism.

Another important object is to provide improved means for supporting a plurality of records in position for delivery successively into playing position on the turntable; a further object being to support the records in vertically stacked relationship and to deliver the same by pushing the edge of the record, to be delivered to the turntable, in a radial direction to release the same from the stack; a further object being to support the record stack above the turntable and to provide edge pushing mechanism in position to engage the lowermost record in the stack; a still further object being to provide edge pushing mechanism conditionable to cooperate with records of various size by moving a manually adjustable element of the pusher mechanism.

Another important object is to support the record stack on a center pin extending centrally of the turntable and having an upwardly facing shoulder to engage the lowermost record in the stack, at its center, and to form the edge pushing mechanism to support the record stack at the edge of the lowermost record.

Another important object is to form the center pin with an upper portion offset with respect to the lower portion of the pin, thereby providing oppositely facing shoulders including an upwardly facing shoulder at the top of the lower pin portion, and a downwardly facing shoulder at the lower end of the upper pin portion, said shoulders being separated the approximate width of a record, the upper pin portion serving to maintain the stacked records in co-axial alignment by extending snugly in the central perforations of the records, the lower record resting upon the upwardly facing shoulder and being movable beneath said downwardly facing shoulder into position aligning its opening with the lower pin portion to release it from said upwardly facing shoulder, thereby allowing the record to drop by gravity on the turntable.

Another object is to provide manually adjustable means including a stop arrangeable in any selected one of a number of control positions for determining the position of the tone arm at the start of a record playing operation so that the device may be set to play records of various size; a further object being to provide for the positioning of the tone arm by operation of the stop against a cooperating latch during the operating cycle of the change mechanism and to release said latch at the conclusion of the operating cycle of the mechanism, whereby the arm may then move freely across the turntable in playing a record.

Another object is to form the latch to receive the stop in any selected one of a plurality of latch detents representing the various possible tone arm starting positions in combination with means actuated by operation of the manually adjustable element of the edge pushing mechanism to select, for operation with the stop, the latch notch corresponding with the record size, for which the edge pushing mechanism may be adjusted.

Another object is to provide improved tripping means for releasing the change mechanism for operation when the tone arm reaches the limit of its record playing movement and also if the arm, before reaching such limit, should receive a rocking movement such as may be applied thereto, upon contact with an eccentric record groove at the termination of the playing grooves of the record, as applied in many standard records, the tripping mechanism also being operable at will for record reject purposes.

Another important object is to provide means for releasing the change mechanism for the performance of its record changing cycle of operation, automatically, at the conclusion of the playing of a record on the turntable, such release being accomplished by tone arm movement at the conclusion of the playing of a record; a further object being to provide for manually releasing the change mechanism for record rejecting purposes during the playing of a record; a further object being to provide for locking the change mechanism in cocked, inoperative position whereby the apparatus may be conditioned to function as if not provided with automatic record change mechanism; a still further object being to provide a single, simple, manual control for accomplishing the foregoing settings, said manual control preferably comprising a slide movable in either direction from a neutral position and serving, when moved in one direction, to operate the change mechanism for reject purposes, and when moved in the other direction, to lock the change mechanism for non-automatic operation, the control slide, when in neutral position, affording automatic operation of the record changing device.

Another important object is to actuate the record changing mechanism by means of a driving cam driven by the turntable motor; a further object being to form the cam directly upon the underside of the turntable; a still further object being to employ a cam of spiral configuration and to drive the record changing mechanism by means of a cam follower forming a part of the change mechanism.

A further object is to provide the change mechanism with a pair of cam followers, preferably comprising pins normally retained in retracted position whereby the change mechanism may be retained in inactive, yet cocked, position ready to perform ts record changing cycle, one of said pins being released to engage the spiral cam at the conclusion of the playing of a record whereby to move the change mechanism to a projected position, said cam follower being relatched when the mechanism reaches such projected position, and the other being released for engagement with the cam to thereby return the change mechanism to inactive position, in which position said second cam follower is relatched whereby the change mechanism, after performing its operating cycle, is returned to the inactive starting position in which it is cocked and ready for a repeat performance.

Another important object is to employ the movement of the change mechanism in one direction to lift and return the tone arm to an inactive or starting position and to then actuate the record changing mechanism, and to employ the movement of the change mechanism, in return direction, to swing and deposit the tone arm, in playing position, on the changed record.

Another important object is to provide for the release of the change mechanism by a latch releasing cam formed on the turntable itself and to accomplish such release through a transfer member, which is normally held in inactive position, in which the latch releasing cam, which turns with the turntable, cannot engage and actuate the transfer member, said transfer member being movable into the path of the cam only when the tone arm reaches the end of a record being played or is rocked either manually or by engagement with an eccentric record groove, or when the reject button is operated, such latch releasing mechanism preventing accidental release of the change mechanism and insuring operation thereof only in the desired manner.

The foregoing and numerous other important objects, advantages, and inherent functions of the invention will become apparent as the same is more fully understood from the following description, which, taken with the accompanying drawings, discloses a preferred embodiment selected for the purpose of demonstrating the invention.

Referring to the drawings:

Fig. 1 is a top plan view of a phonographic record player embodying the present invention;

Fig. 2 is a partial side view of the apparatus shown in Fig. 1, certain parts being shown in section to reveal the structural details thereof;

Fig. 3 is a perspective view of a record support pin forming a part of the apparatus;

Fig. 4 is a perspective view of the underside of the turntable forming a part of the apparatus;

Fig. 5 is a perspective view of the upper portions of the record player with the turntable removed;

Fig. 8 is a view similar to Fig. 6, showing the record changing mechanism in the intermediate projected position occupied during the record changing cycle;

Figure 11:
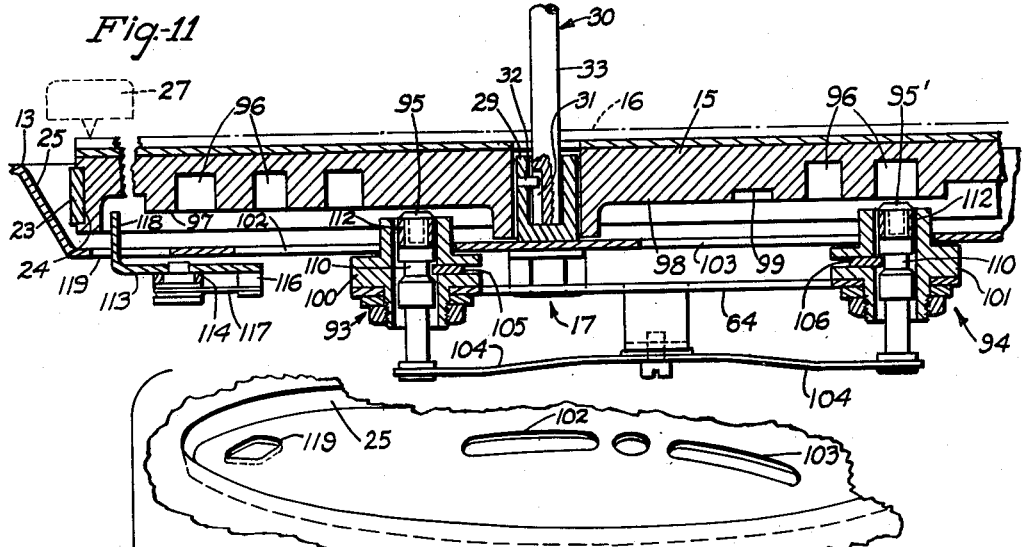

Figs. 9, 10 and 11, respectively, are sectional views taken substantially along the lines 9—9, 10—10 and 11—11 in Fig. 8.

Figure 6:
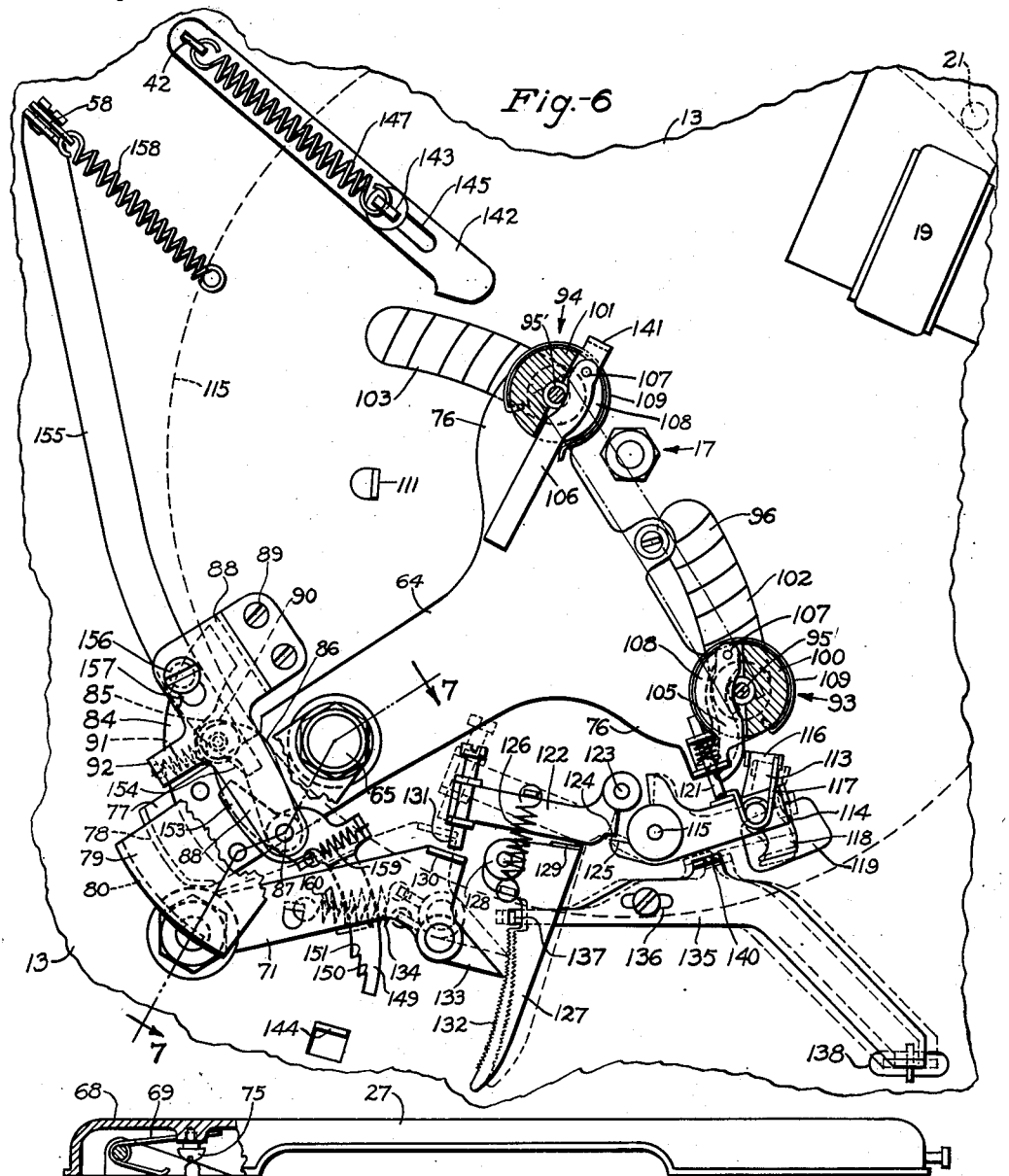
Fig. 6 is an enlarged plan view of the underside of the apparatus shown in Fig. 5, the record changing mechanism being shown in the normal retracted and cocked position ready for the performance of a record changing cycle.
Figure 12:
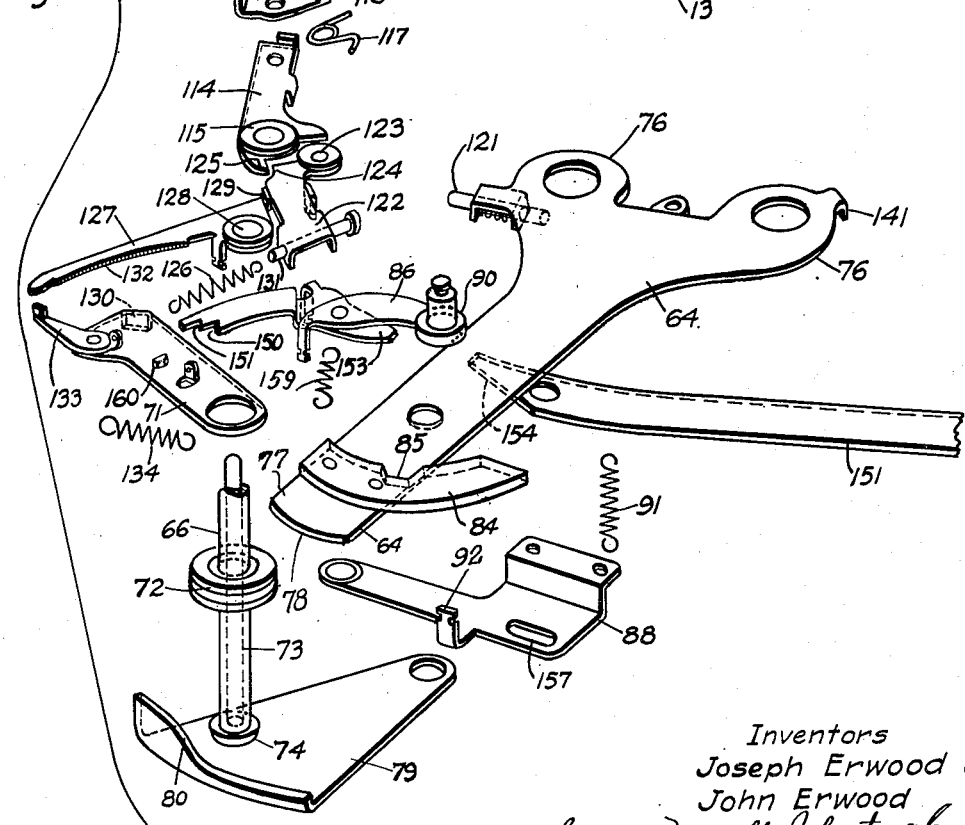

Fig. 12 is a perspective view of portions of the apparatus shown in Fig. 6, as viewed from above;

Fig. 13 is a top plan view of edge supporting and pushing mechanism forming a part of the record changing apparatus, the mechanism being shown in position adjusted for records of large size;

Fig. 14 is a sectional view taken substantially along the line 14—14 in Fig. 13, showing the apparatus in its normal or inactive position.

Fig. 15 illustrates the apparatus shown in Fig. 14 in record ejecting position;

Fig. 16 is a top plan view of the apparatus shown in Fig. 13 and illustrating the same in position adjusted for the accommodation of relatively small records;

Fig. 17 is a sectional view taken substantially along the line 17—17 in Fig. 16, showing the apparatus in normal inactive position;

Fig. 18 is a view of the device, as shown in Fig. 17, illustrating the parts in record ejecting position; and Fig. 19 is a view of the device, as shown in Fig. 14, illustrating the parts in position adjusted to accommodate relatively large records.

To illustrate the invention, the drawings show a record player 11 comprising a support plate 13 carrying a record turntable 15 adapted to support records 16 in playing position thereon. The turntable is mounted for rotation on the support plate about the axis of a central support 17 secured on the plate 13, the turntable being preferably driven by an electrical motor 19, which is preferably supported by and on the underside of the plate 13, the motor being drivingly connected with a turntable driving wheel 21. This driving wheel may extend upwardly of the plate 13, through an opening 22 in the plate, and forms frictional driving connection with the turntable preferably by engagement with a rubber band 23 set in a groove 24 formed at the peripheral edge of the turntable. The plate 13 preferably has a central depression 25 formed therein to receive the turntable, the upper record supporting surface of which is supported in a plane only slightly above the plane of the plate portions surrounding the depression. The turntable thus, in a sense, is sunk into the plate 13. The wheel 21 may comprise an enlarged cylindrical head, which may be formed integrally on the shaft of the motor 19, and the cylindrical surfaces of the head may be knurled or otherwise roughened for non-slip driving engagement with the band 23.

Operation of the motor 19 to drive the turntable may be controlled by means of a suitable switch 20, preferably mounted on the plate 13, the switch having its manually operable member exposed for operation above the plate and being electrically connected, beneath the plate, in a suitable electrical motor energizing circuit.

The plate 13, outwardly of the turntable, carries a pedestal 26 on which a tone pickup arm 27 is pivoted for swinging movement about the vertical axis of the pedestal. The arm is also mounted for movement about a horizontal axis at the top of the pedestal so that a pickup device at the swinging end of the arm may be depressed to rest upon or may be lifted from a record in playing position on the turntable.

The pickup device on the arm 27, of course, may be connected with any suitable sound reproducing apparatus so that by applying the pickup device to a record on the turntable and by energizing the motor 19 to rotate the same, the apparatus may reproduce the sounds recorded on the record.

Mechanism is provided for the automatic delivery of records upon the turntable in position to be played by the pickup device. Such mechanism may comprise means for supporting a stack of records 28 in position to be delivered successively in playing position upon the turntable, in combination with operable means for ejecting records, one by one, from the stack and onto the turntable. To this end, the turntable support 17 preferably comprises a hollow bushing 29 upon the outer cylindrical surfaces of which the turntable is journaled for rotation by the driving wheel 21. This bushing is fastened rigidly upon the plate 13 and has a central axial bore for snugly, yet detachably, receiving the lower end of a center pin 30, the lower end of said pin being formed with means for preventing relative rotation thereof in the bushing 29.

To this end, the center pin 30, at its lower end, may be provided with an axially extending slot 31 formed in the side of the pin and extending to the lower end thereof. The bushing 29 may be provided with a pin 32 having an inner end extending into the bore of the bushing in position to engage the slot 31, when the center pin is inserted in the bushing, to thereby orient the center pin and determine its relative angular position with respect to the rest of the mechanism. The center pin 30 has a lower record guiding portion 33 and an offset record supporting portion 34, said lower pin portion 33 being in co-axial alignment with the axis of rotation of the turntable. The lower pin portion 33, at its upper end, provides an upwardly facing shoulder 35 on one side of the pin, while the offset pin portion 34, at its lower end, provides a downwardly facing shoulder 36 on the other side of the pin. The shoulders 35 and 36 are spaced apart a distance slightly in excess of the thickness of records to be accommodated in the apparatus.

The foregoing arrangement of the pin allows it to function as a means for supporting the stack 28 of records to be played, the records comprising such stack being carried in concentric alignment with the offset pin portion 34 extending through the aligned central openings of the records. The records, of course, may be applied to the offset pin portion by inserting their aligned openings over the upper, preferably rounded, end of the pin portion and the records are supported by the upwardly facing shoulder 35, which underlies the lowermost record at the central opening thereof.

It will be noted that all of the records in the stack 28, except the lowermost record, are positively held in concentric alignment with the upper pin portion 34. Since the downwardly facing shoulder 36 of said pin portion 34 is spaced from the upwardly facing shoulder 35 a distance slightly greater than the thickness of a record, the lowermost record of the stack may be moved in a direction to align its central opening with the lower pin portion 33. When so moved, the lowermost record will be free to fall, under the influence of gravity, in a downward path guided by the pin portion 33 and thus be deposited as a record 16 on the turntable in position to be played.

In order to thus move the lowermost record in the stack 28 to release or eject it from the stack and deposit it by gravity in playing position upon the turntable, edge pushing mechanism 37 is provided. This pushing mechanism 37 is shown more particularly in Figs. 13-19 of the drawings and comprises a suitable, preferably sheet metal, frame forming a pedestal 38 mounted on the support plate 13 outwardly of the edge of the turntable. The frame includes a projecting lip preferably comprising a pair of tongues 39 in substantially horizontal alignment with the shoulder 35 and adapted to underlie the marginal edge of the lowermost record of the record stack 28 when the records of such stack are of relatively large size, such as standard twelve-inch phonograph records. The record stack thus is supported centrally on the shoulder 35 of the center pin 30 and also marginally by the spaced tongues 39, thereby affording three-point support for the record stack.

The pedestal carries a pusher arm 40 pivoted for rocking movement about a preferably horizontal support pin 41, which is mounted in the pedestal 38. The arm 40 has an end 42 extending downwardly through a slot 43 in the plate 13 and has an upper end on which is pivoted a pusher finger 44, said pusher finger having a tip extending in a notch 45 in the lip 39 and being movable in said notch against the edge of the lowermost record in the stack 28 to thereby shift it in the stack in a direction to release said record from the shoulder 35 in order to allow it to drop downwardly along the pin portion 33.

In order to accommodate records of relatively small size, such as standard ten-inch phonograph records, the pedestal 38 carries a pivoted plate 48 mounted on pivots 49 in the bracket, said plate being normally arrangeable in the inactive position shown in Figs. 14 and 15 of the drawings. When so positioned, the plate 48 is in position allowing the application of records of relatively large size in operating position on the lips 39. When it is desired to condition the apparatus to accommodate records of relatively small size, the plate 48 may be swung downwardly to the position shown in Figs. 16 to 19, in which it overlies the lip member 39 and provides lips 50 in position to underlie and support the edge of a stack 28 of relatively small size records. The plate 48 carries a pusher stem 51 having a pusher end disposed opposite the edge of the lowermost record supported on the lips 50, said stem 51 being normally held in retracted position by means of a spring 52. The inner end of the stem 51, however, extends in position to be engaged by the pushing finger 44 on the lever 40 so that when it is desired to eject a record of relatively small size from the stack 28, the lever 40 may be moved thereby causing the finger 44 to press the stem 51 in a direction to engage the edge of and move the lowermost record of the stack in a direction to release it from the shoulder 35.

The tiltable finger piece 44, when projected to push a record, engages an abutment 53 on the lever 40 to hold it in pushing position on the lever. The finger piece, however, may turn on the lever 40 in a direction to disengage the abutment 53 when the lever is in the retracted position shown in Fig. 17. A spring 54, however, normally urges the finger piece in a direction to engage the abutment as the lever is moved into its record pushing position.

The bracket 38 carries a record retaining flap 56 pivoted for movement on a pin 57 and adapted to overlie upon the record stack 28 above the edge supporting lips in order to hold the stack upon the lips in position to insure engagement of the ejecting finger 44 with the edge of the lowermost record in the stack, when the lever 42 is moved to release such record. The flap 56 may be raised to the dotted line position shown in Fig. 17 in order to allow the insertion of the record stack 28 in operating position on the pin 30 and the lips 39 or 50. If desired, overcentering spring means may be applied to resiliently hold the flap in raised and in record holding positions.

The pedestal 38 also carries pivoted thereon a lever 58 having an end projecting through a slot 59 in the plate 13 and an end 61 extending adjacent the top of the pedestal in position to be engaged by a projection 62 on the member 48. The lever 58 may be interconnected, beneath the plate 13, with mechanism for determining the starting position of the tone arm 27, the lever 58 serving to position the tone arm to commence the playing of a large twelve-inch record, automatically, when the member 48 is in raised position, as shown in Fig. 14. When the member 48 is in the depressed position shown in Fig. 19, the lever 58 serves to position the tone arm correctly for the playing of a record of small size.

In order to correlate operation of the record changing mechanism 37 with record playing movement of the arm 27, simplified mechanism is provided. This mechanism operates automatically for record changing purposes by first lifting the tone arm from a record being played, then swinging it outwardly of the record on the pedestal 26 to a stand-by position entirely clearing the turntable. In its cycle of operation, the record changing mechanism then actuates the pusher mechanism 37 to deposit the lowermost record of the stack 28, in playing position, on the turntable. Finally, the change mechanism moves the arm 27 inwardly of the turntable and drops it upon the record in position to start playing the same.

As shown more particularly in Figs. 6–12 of the drawings, the change mechanism includes a movable frame 64 on the underside of the support plate 13 and pivoted for swinging movement about a pin 65, which is fastened to the plate. This frame comprises an operating member periodically movable under the driving influence of the motor 19 and cooperatively associated with the tone arm to raise and swing the same to stand-by position upon the completion of the playing of a record, said operating member also serving to actuate the record feeding mechanism 37 and, after delivery of a record in playing position on the turntable, to swing and drop the tone arm upon the turntable in position to commence the playing of the record.

Novel latch control means is provided for drivingly connecting the operating member 64 with the motor 19 at the conclusion of the playing of a record or at any time during the playing of a record, subject to the will of the operator, in order to initiate and carry out the record changing cycle of operation of the apparatus. Improved and simplified means is provided for raising and swinging the tone arm 27 in response to movement of the operating member and for determining the starting position in which the arm is dropped, by the mechanism, upon a record to be played. As a further refinement, simplified means is provided for latching and thus securing the operating member in stand-by position to thereby disable the record changing apparatus and to allow the record playing mechanism to function with the automatic record changing equipment inoperative.

Figure 7:
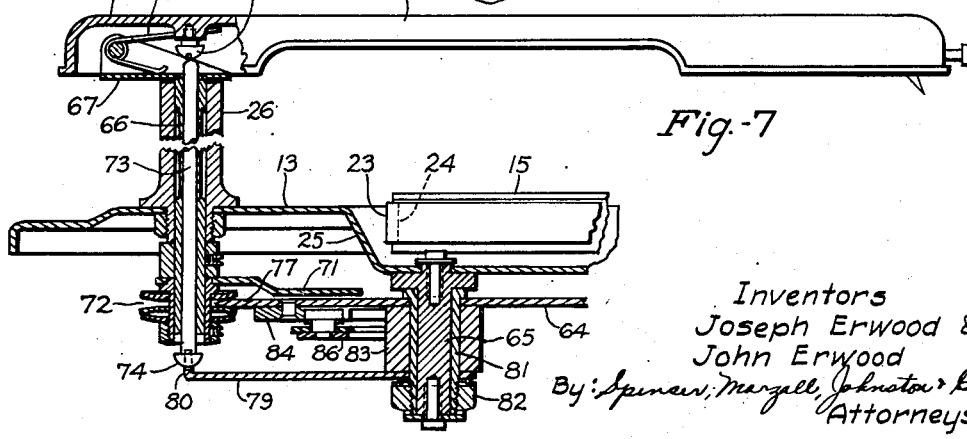
Fig. 7 is a sectional view taken substantially along the line 7—7 in Fig. 6.

To this end, as shown more particularly in Fig. 7 of the drawings, the tone arm support pedestal 26 forms a vertical bearing for an arm supporting tube 66, which is turnable within the pedestal 26. One end of the tube 66 extends at the upper end of the pedestal and carries a bracket 67 above the pedestal. The tone arm 27 is pivotally mounted on the bracket by means of a horizontal pivot pin 68, there being a counterbalancing spring 69 mounted on the pin 68 and pressing in opposite directions upon the bracket 67 and tone arm to thereby resiliently assist in counterbalancing the weight of the tone arm.

The tube 66 has an end extending outwardly of the pedestal beneath the support plate 13, said end carrying an arm or blade 71 extending radially outwardly of the tube and turnable therewith. The tube 66, adjacent the arm 71, also carries a friction pulley 72 fixed on the tube, the arm 71 and pulley 72 being secured on the tube by suitable clamping members. The arm 27 may thus swing horizontally about the vertical axis of the pedestal 26, and the arm 71 and pulley 72, being drivingly connected with the tone arm, will move therewith.

Vertically movable within the bore of the tube 66 is a pin 73 having a head 74 extending outwardly of the tube 66 at the end thereof beneath the plate 13. The other end of the pin 73 extends outwardly of the tube 66 at the bracket 67 in position to engage a shoe 75 which may conveniently comprise the head of a screw threaded into and forming a part of the tone arm. By moving the pin 73 axially in the tube or sleeve 66, the elevation of the arm 27 with respect to the turntable may be adjusted. By pushing the pin 73 upwardly, the arm 27 may be swung upwardly on its pivot 68 and, conversely, by lowering the pin 73, the tone arm also may be lowered onto the turntable.

The operating member 64 preferably comprises a metal plate having a pair of arms 76 formed thereon at one end of the member. The member 64 at its opposite end, forms a segmental plate 77 having a circular edge 78 centering on the pivot pin 65, said edge extending into position to cooperate with the pulley 72 in order to turn the same and the tone arm 27 in response to pivotal movement of the operating member about the pin 65. Fastened to the member 64 and movable therewith about the axis of the pin 65 is a segmental plate 79 having an edge provided with an upstanding flange in position to move beneath the headed end of the pin 73, said flange being curved about the axis of the pin 65 as a center. The pin engaging edge of the flange 80 forms a cam surface serving to raise and lower the pin 73 in the sleeve 66, and hence to raise and lower the tone arm 27 as the plate 79 is moved back and forth beneath the pin 73 by the operating member with which it is connected.

The pin 65, of course, is secured on the plate 13 in any suitable or preferred fashion. The operating member 64 and the plate 79 may comprise sheet metal stampings, which may be secured together by clamping the same upon a bushing 81, as by means of a clamping nut 82, the member 64 and the plate 79 being secured in spaced relationship by means of a spacing ring 83. The bushing 81 forms a journal for pivotally supporting the member 64 and plate 79 on the pivot pin 65.

The operating member 64 normally occupies the stand-by position illustrated in Fig. 6 during the playing of a record. The operating member is yieldingly retained in such stand-by position by means of a cam latch comprising a cam member 84 riveted or otherwise fastened upon the member 64 and formed with a detent notch 85 for the reception of a latch member comprising a lever 86 pivotally secured, as at 87, on a bracket 88, said bracket in turn being secured, as at 89, on the plate 13. The member 86 carries a cam following roller 90 and is urged in a direction to press the roller 90 against the cam member 84, as by means of the spring 91, connected between the roller carrying end of the lever and a finger forming portion 92 of the bracket 88.

The arms 76 of the operating member 64 carry selectively operable clutch devices 93 and 94 for drivingly connecting the member with the motor 19. As shown, the devices 93 and 94 comprise retractable pins 95, 95′, adapted to be held normally in retracted position on the arms 76, but releasable for projection into position in which they may engage and ride along a camway 96 preferably comprising a spiral groove formed in a turnable member driven by the motor. The camway 96 conveniently may comprise a groove cut or otherwise formed directly in the turntable 15 on the underside thereof, as shown more particularly in Fig. 4 of the drawings. The spiral groove may be formed in an embossment 97 formed on the underside of the turntable, and may extend from the outer portions of the embossment toward its central portion, which forms a land 98. The groove preferably has uniform depth throughout its entire length from its outer end to adjacent the inner end of the groove. At its inner end, however, the groove preferably becomes shallower and provides a pin depressing incline 99, which merges into the surface of the central land 98 at the inner end of the groove.

The clutch devices 93 and 94, as shown more particularly in Fig. 11 of the drawings, preferably each comprise a bushing 100 and 101 secured at one end thereof upon the member 64, as by suitable holding nuts threaded upon the bushings and clamping the same in place upon the arms 76 of the member 64. The bushings 100 and 101 respectively, extend through curved slots 102 and 103 formed in the plate 13. The slots 102 and 103 are curved about the axis of the pivot pin 95 as a center, and the bushings 100 and 101 have ends extending upwardly of the plate 13 immediately beneath the embossment 97 of the turntable. Each bushing 100, 101, carries its respective pin 95, 95′, axially movable therein with an end exposed at the lower end of the bushing.

The pins 95, 95′, also have portions projecting at the lower ends of the bushings for engagement with preferably leaf spring means 104 mounted on the member 64 and serving yieldingly to urge the pins in an upward direction in the bushing. The pins, however, are normally retained in retracted position against the influence of the spring means 104 by latches 105 and 106. These latches may comprise levers pivoted, as at 107, in lateral slots 108 formed in the bushings. The latches are yieldingly urged as by springs 109 in a direction to normally seat in circumferential latch grooves 110 formed in the retractable pins 95, 95′. The levers 105 and 106, however, may be moved against the influence of the springs 109 to release the pins 95, 95′, for projecting movement in their support bushings under the influence of the spring means 104.

By releasing the latch 105, the pin 95 of the clutch device 93 may be projected into engagement with the outer portions of the groove 96, thereby causing the operating member 64 to move from stand-by position shown in Fig. 6 to the projected positon shown in Fig. 8. When such projected position is reached, the driving pin 95 of the clutch member 93 will ride the inclined portion 99 of the groove onto the land 98 thereby pushing the pin in its retracted position in which it will be secured by the latch 105. However, when the operating member 64 reaches the projected position shown in Fig. 8, the latch 106 will be released by engagement with a latch releasing stop 111 which may conveniently comprise a lug struck downwardly from the bottom of the plate 13. Release of the latch 106 will permit the pin 95′ of the clutch member 94 to be projected into operative engagement with the outer portions of the groove 96, thus returning the operating member 64 to the initial or stand-by position shown in Fig. 6 by the operation of the groove 96 upon the projected pin of the clutch member 94. When the member 64 reaches stand-by position, the pin 95' of the clutch member 94 will be relatched as it rides up the groove incline 99 and onto the land 98, thus completing the operating cycle of movement of the member 64.

If desired, the groove engaging ends of the pins 95, 95', may be provided with cylindrical inserts 112 for anti-friction wearing purposes in traveling the groove 96.

Latch tripping means is provided for tripping the latch member 105 to initiate the record changing cycle of the operating member 64, such latch tripping means comprising a tripping lever 113 pivotally secured on the end of a positioning lever 114. The lever 114 is pivoted, as at 115, upon the plate 13. The tripping lever 113 has an arm 116 in position to engage and trip the latch member 105 when the operating member 64 is in stand-by position, shown in Fig. 6. The tripping lever 113 is normally held in retracted position by means of a spring 117, and said tripping lever has an end 118 which is bent and which projects through an opening 119 in the plate 13 into position within and adjacent the depending rim of the turntable, said rim carrying a latch tripping projection 120 thereon in position to engage the lever portion 118 as the turntable turns, providing the positioning lever is in the projected latch tripping position shown in dotted lines in Fig. 6.

When the member 64 is in the stand-by position shown in Fig. 6, the positioning lever is resiliently urged toward latch tripping position by means of a spring pressed pin 121 carried by the operating member 64. The positioning lever, however, is held in retracted position by a holding lever 122 which is pivoted, as at 123, on the plate 13. The lever 122 has a shoulder 124 adapted normally to extend in position to engage a projecting finger 125 formed on the positioning lever 114 to thereby hold the positioning lever in retracted position, shown in solid lines in Fig. 6, in which position the tripping projection 120 on the turntable clears the portion 118 of the tripping lever 113.

A spring 126 yieldingly holds the lever 122 in position locking the positioning lever in retracted position. The lever 122, however, may be turned on its pivot 123 against the influence of the spring 126 to release the positioning lever 114. By thus moving the lever 122 from the normal or latching position shown in solid lines in Fig. 6, to the position shown in dotted lines in said figure, the positioning lever 114 will be released for movement from its retracted position shown in solid lines in Fig. 6 to its projected position indicated in dotted lines in said figure. Such projecting movement of the lever 114 is accomplished under the urge of the spring pressed pin 121 carried by the operating member 64. When in its projected position, the lever 114 presents the latch tripping lever 113 in position to be engaged by the latch tripping lug 120 on the turntable. This lug, as the turntable rotates, will repeatedly hit the portion 118 of the latch tripping lever only when the positioning lever is in projected position. Engagement of the tripping finger with the tripping lever 118, however, will cause the same to release the latch 105 to initiate the operating cycle of movement of the operating member 64.

As soon as the operating member 64 moves away from cocked position, shown in Fig. 6, after release of the latch 105, the positioning lever, being released by the pin 121, will be returned to its retracted position by the action of the lug 120 on the tripping lever. When so returned to retracted position, the positioning lever will relatch with the shoulder 124 of the lever 122, which immediately after being released will return to latching position under the influence of the spring 126. Thus, the lever 114 will become relatched in retracted position ready for a repeat latch tripping cycle after the operating member 64 shall have completed its operating cycle and shall have been returned to the initial or cocked position shown in Fig. 6.

Unlatching movement of the lever 122 against the bias of its spring 126 may be accomplished by direct engagement of the arm 71 with the lever 122 when the tone arm 27 is in position at the end of the playing of a record on the turntable. Unlatching movement of the lever 122 may also be accomplished by the lever 71 operating indirectly through a lever member 127, which is pivoted as at 128 on the support plate 13. This lever member 127 has a shoulder 129 adapted to press upon the lever 122 and move the same in a direction to release the shoulder 124 from the tongue 125, thereby releasing the positioning lever.

At the commencement of the playing of a record, the arm 71 will occupy a position approximately as shown in dotted lines in Fig. 8 of the drawings. During the playing of the record, the movement of the tone arm radially of the turntable, toward the center thereof, will cause the arm 71 to travel in a counter-clockwise direction, viewing Fig. 8, to a position, at the conclusion of the playing of the record, substantially as indicated in dotted lines in Fig. 6. When it reaches such position, a lug 130 on the arm 71 will engage a pin 131, or other suitable bearing on the lever 122 so that continued movement of the arm 71 will move the lever 122 to its unlatching position, to thus initiate the record changing cycle of operation of the operating member 64.

The arm 71 has an end which swings adjacent a preferably curved edge of the lever 127, said arm 71 being provided with means for moving the lever 127 to release the latch lever 122 at the completion of the playing of a record and also during the playing of the record.

To this end, the lever 127 in its preferably curved edge facing the swinging end of the arm 71 is provided with a series of teeth 132 along said edge, while the arm 71, at its swinging end, carries a tooth 133 pivoted on the arm. This tooth is connected with a relatively weak spring 134 which serves yieldingly to hold the tooth 133 in position, at the swinging end of the arm, to engage the teeth 132 on the lever. So long as the arm 71 travels continuously and progressively in one direction during the playing of a record, the action of the tooth 133 will be to slide across the teeth without moving the lever 127 on its pivot, the spring 134 yielding to allow the tooth 133 to thus traverse the teeth 132.

Disc records are frequently provided with an eccentric groove into which the pickup device rides at the conclusion of the playing of the sound track of the record. When the pickup device enters such an eccentric record groove, the tone arm 27 and the arm 71 will be rocked back and forth. As the arm 71 is thus rocked backwardly from he position shown itn solid lines in Fig. 6, the tooth 133, being locked with one of the teeth 132, will straighten itself on the arm 71 and rotate the lever 127 in a direction on its pivot to cause the lug 130 thereon to shift the lever 122 and thus unlatch the operating member 64 and release it for the performance of a record changing cycle.

The lever 127 may be thus actuated either by rocking movement of the arm 71 induced by engagement of the tone arm with an eccentric record groove, or by the manual lifting and rocking of the tone arm during the playing of a record.

Means for moving the lever 127 manually is also provided, said means comprising a slide bar 135, slidably mounted preferably on the underside of the plate 13, as by means of the pin and slot connection 136. The slide bar has a lug 137 disposed in position to move the lever 127 when the slide bar is drawn in one direction, from the neutral position illustrated in Figs. 6 and 8 of the drawings. The slide bar has a portion extending upwardly of the plate 13 through a slot 138 therein, said upwardly extending portion being fitted with a finger piece 139. When the bar is in its neutral position, the change mechanism will be released for normal automatic operation, wherein the changing mechanism is set in operation at the conclusion of the playing of a record. The change mechanism may be caused to perform a record changing operation during the playing of a record by operating the finger piece 139 in one direction, and if said finger piece is operated from its neutral position in the opposite direction, a lug 140 on the bar 135 will be disposed in position against the lever 114 preventing the same from moving under the influence of the pin 121 upon the operation of the release lever 122, thereby locking the change mechanism against automatic operation. The bar 135 and its three-position finger piece 139 thus affords an exceedingly simple manual control operable to selectively condition the apparatus for automatic record changing operation or for manual operation of the phonograph; and the finger piece 139 allows the initiation of the record changing cycle at any time, as for the purpose of rejecting an unwanted record after the playing of the same has commenced.

Upon release of the latch 105 at the completion of the playing of a record, or during the playing of the record, upon manual operation of the finger piece 139, the operating member 64, as a result of the successive actuation of the clutch devices 93 and 94, moves from the position shown in Fig. 6 to the position shown in Fig. 8 and then returns to the initial or starting position, as heretofore described. During its movement from the starting position shown in Fig. 6, toward its projected position shown Fig. 8, the tone arm 27 will first be raised by the operation of the cam 80 on the pin 73. Thereafter, the tone arm 27 will be swung outwardly of the turntable to a stand-by position shown in dotted lines in Fig. 8, such stand-by position being determined by engagement of the arm 71 with a stop 144. When in such stand-by position, the tone arm 27 clears the space immediately beneath the record stack 28. This outward swinging movement of the tone arm is accomplished by the sleeve 66 and friction wheel 72 under the influence of its driving segment 77. As the operating member 64 reaches its projected position, a lug 141 thereon will engage with the end of an actuator bar 142, which is slidingly mounted preferably on the underside of the plate 13, as by means of a depending lug 143 on the plate and a slot 145 in the bar. The bar 142 extends to and is connected with the actuating lever 42 of the record delivery mechanism 37. The actuating lever 42 and its actuating bar 142 are normally held in retracted position by means of a spring 147 interconnected between the lever 42 and the lug 143 so that the record edge pushing finger 44 is normally held in retracted position, but is actuated to deliver a record from the stack 28 onto the turntable whenever the lug 141 shifts the actuator bar 142. A record from the stack 28 is thus delivered onto the turntable as the operating member 64 reaches the projected position shown in Fig. 8.

During its return movement from projected to stand-by position, the operating member 64, through the action of the segment 77 and driving pulley 72 will move the tone arm and the latch tripping arm inwardly of the turntable to a starting position determined by an adjustable stop member 149 which will stop the inward movement of the tone arm opposite the outer edge of the record to be played on the turntable. Thereafter, the pulley 72 will be held against turning and the driving segment 77 will slip on the pulley as the operating member 64 completes its returning movement to stand-by position. Such continued movement of the operating member after the tone arm has reached its starting position will, however, drop the tone arm upon the edge of the record in position to commence the playing thereof by the operation of the cam 80 beneath the pin 73. As the operating member 64 thus drops the tone arm on the record, it also actuates the stop member 149 to release the arm for record playing movement in a direction toward the center of the turntable.

To this end, the stop member 149 comprises a lever having one or more stop shoulders 150 and 151, the lever being pivoted on the pin 87 on which the cam following lever 86 is also pivoted. The lever 149 has a projecting tongue 153 in position to engage an adjustable stop 154, which may be formed conveniently on a selector bar 155. This selector bar is slidably mounted preferably on the underside of the plate 13 as by means of a pin 156 on the bar and a slot 157 in the bracket 88. The bar 155 extends to and is connected with the lever 58 of the record delivery mechanism 37 and may be connected with spring means 158 connected between the bar and the plate 13 to facilitate the sliding movement of the bar between its operating positions, shown in solid and in dotted lines in Fig. 8, when the lever 58 is moved by the adjustable member 48 of the record delivery mechanism.

When said adjustable member 48 is in its raised position, as shown in Fig. 14, to accommodate relatively large size records, the bar 155 may occupy the position shown in solid lines in Fig. 6 and in dotted lines in Fig. 8. When the member 48 is in its lowered position, as shown in Fig. 17, to accommodate relatively small records, the bar 155 may occupy the shifted position shown in solid lines in Fig. 8. The adjustable stop lever 149 is normally urged, as by a spring 159 connected between a lug on the lever 149 and a lug on the cam following lever 86, in a direction toward a stop lug 160 on the arm 71, the movement of the lever 149 under the influence of the spring 159 being limited by the engagement of the tongue 153 and the adjustable stop 154. When the selector bar 155 is in position to accommodate large records, as determined by the manual adjustable member 48, the tongue 153 and stop 154 limit the movement of the lever 149 to a position in which the stop lug 160 will engage with the stop shoulder 150 as the tone arm 27 is moved inwardly to position the same for the commencement of the playing of a record. The engagement of the stop lug with the shoulder 150 will determine the starting position of the tone arm for playing relatively large size records.

When the selector bar 155 is in position, as determined by the manually operable member 48, to accommodate relatively small records, the tongue 153 and stop 154 limit the movement of the lever 149 to a position in which the stop lug 160 will engage with the stop shoulder 151 as the tone arm 27 is moved inwardly to position the same for the commencement of the playing of a record. The engagement of the stop lug with the shoulder 151 will determine the starting position of the tone arm for playing relatively small size records.

It will be seen from the foregoing that the device of the present invention affords exceedingly simple, yet positively acting mechanism for initiating and controlling the performance of a record changing cycle. Inexpensive means comprising the three-position selector and reject button 139 is provided for record rejecting purposes and to control the mechanism for automatic or manual operation. The employment of the positioning lever 114 affords an exceedingly simple and inexpensive, yet positive means, in combination with the lug 120 on the turntable, for positively determining the release of the latch 105 for the commencement of the record changing cycle. The positioning lever 114, in combination with the lug 140 on the control bar, affords exceedingly simple and inexpensive, yet positive means for latching the mechanism against operation, and, in combination with the lever 122 furnishes positive latch releasing control.

The mechanism also affords exceedingly satisfactory and inexpensive means for conditioning the same to accommodate records of various size by the correlation of the stop member 149 with the manually shiftable device 48, the operation of which is necessary to fit the record delivery mechanism to the size of the records being played.

An important feature of the invention is the rapidity with which the record changing operation is effected, the time required being approximately one-half of that required in the device shown in our United States application, Serial No. 564,210 filed November 20, 1944, of which the present application is a continuation-in-part.

It is thought that the invention and its numerous attendant advantages will be fully understood from the foregoing description and it is obvious that numerous changes may be made in the form, construction and arrangement of the several parts without departing from the spirit and scope of the invention, or sacrificing any of its attendant advantages, the form herein disclosed being a preferred embodiment for the purpose of demonstrating the invention.

Having thus described the invention, what we claim as new and desire to secure by Letters Patent of the United States is:

1. Phonographic apparatus comprising a record disc turntable, a motor for turning the same, a tone arm movable with respect to the turntable, disc changing means for moving the tone arm to a retracted position, for depositing a record disc in playing position on the turntable and for projecting the arm into playing engagement with the record disc, comprising an actuating member normally retained in cocked, stand-by position, clutch means operable to drivingly connect the actuating member with said motor for the performance of a record changing cycle of operation, latch means to hold the clutch means in inactive condition, and latch release means for releasing the clutch means to operatively cycle said actuating member, said latch release means comprising latch tripping means movable between operative and inoperative positions, means driven by said motor for periodically actuating said latch tripping means when the same is in operative position, and operating means operable to project said tripping means to its operative position to cycle said actuating member, said operating means comprising yielding means normally urging said tripping means toward operating position, holding means for holding said tripping means in inoperatve position, and release means for releasing said tripping means from said holding means.

2. Phonographic apparatus comprising a record disc turntable, a motor for turning the same, a tone arm movable with respect to the turntable, disc changing means for moving the tone arm to a retracted position, for depositing a record disc in playing position on the turntable and for projecting the arm into playing engagement with the record disc, comprising an actuating member normally retained in cocked, stand-by position, clutch means operable to drivingly connect the actuating member with said motor for the performance of a record changing cycle of operation, latch means to hold the clutch means in inactive condition, and latch release means for releasing the clutch means to operatively cycle said actuating member, said latch release means comprising latch tripping means movable between operative and inoperative positions, means driven by said motor for periodically actuating said latch tripping means when the same is in operative position, and operating means operable to project said tripping means to its operative position to cycle said actuating member, said operating means comprising yielding means normally urging said tripping means toward operating position, holding means for holding said tripping means in inoperative position, release means for releasing said tripping means from said holding means, and means drivingly connecting said release means with said tone arm for actuation thereby.

3. Phonographic apparatus comprising a record disc turntable, a motor for turning the same, a tone arm movable with respect to the turntable, disc changing means for moving the tone arm to a retracted position, for depositing a record disc in playing position on the turntable and for projecting the arm into playing engagement with the record disc, comprising an actuating member normally retained in cocked, stand-by position, clutch means operable to drivingly connect the actuating member with said motor for the performance of a record changing cycle of operation, latch means to hold the clutch means in inactive condition, and latch release means for releasing the clutch means to operatively cycle said actuating member, said latch release means comprising latch tripping means movable between operative and inoperative positions, means driven by said motor for periodically actuating said latch trip-ping means when the same is in operative position, and operating means operable to project said tripping means to its operative position to cycle said actuating member, said operating means comprising yielding means normally urging said tripping means toward operating position, holding means for holding said tripping means in inoperative position, release means for releasing said tripping means from said holding means, and manually operable means for actuating said release means.

JOSEPH ERWOOD.
JOHN ERWOOD.

REFERENCES CITED

The following references are of record in the file of this patent:

UNITED STATES PATENTS

| Number | Name | Date |
| --- | --- | --- |
| 1,505,307 | Bennett | Aug. 19, 1924 |
| 1,700,969 | Bauer et al. | Feb. 5, 1929 |
| 1,938,810 | Collison et al. | Dec. 12, 1933 |
| 2,015,737 | Winchell | Oct. 1, 1935 |
| 2,198,294 | Rich | Apr. 23, 1940 |
| 2,287,093 | Habegger | June 23, 1942 |
| 2,328,641 | Glaser | Sept. 7, 1943 |
| 2,331,383 | Faulkner | Oct. 12, 1943 |
| 2,339,981 | Cranmer et al. | Jan. 25, 1944 |
| 2,343,992 | Morrison | Mar. 14, 1944 |
| 2,352,542 | Heins | June 27, 1944 |
| 2,394,539 | Erwood et al. | Feb. 12, 1946 |